Patented Apr. 18, 1939

2,155,009

UNITED STATES PATENT OFFICE 2,155,009

MANUFACTURE OF POLYMERIZED DRYING OILS

Eric William Fawcett, Reginald Oswald Gibson, and Michael Willcox Perrin, Winnington, Northwich, England, assignors to Imperial Chemical Industries Limited, a corporation of Great Britain No Drawing. Application February 5, 1936, Serial No. 62,544. In Great Britain February 15, 1935

6 Claims. (Cl. 260—407)

This invention relates to the production of polymerized drying oils, or polymerized drying oil fatty acids, which may be intermediate substances in the production of synthetic polymerized drying oils.

In the production of polymerized or bodied drying oils from drying oils, the latter are usually subjected to the action of heat, with or without catalysts and with or without the action of air or oxygen. The products are technically known as stand oils or as blown oils and have many uses, notably for the preparation of paints, varnishes, printing inks and the like.

A process is also known for the production of synthetic polymerized drying oils, which comprises the steps of saponifying and acidifying the initial drying oil (e. g. linseed oil), subjecting the fatty acids so obtained to the action of heat at ordinary pressure to effect the heat polymerization of the fatty acids (an action like that in making stand oils), distilling away (suitably in vacuo) the monomeric from the polymeric acids, and esterifying the latter to produce the required drying oil from the polymerized acids.

Heat polymerization, whether of drying oils or of drying oil fatty acids, necessitates a fairly high temperature (such as 280° C. or over) and a fairly long period of heating—two factors which influence the properties of the products obtained. The application of heat to most vegetable and some animal oils causes a thickening or polymerization of the oil. Temperatures which will cause polymerization usually lie between 450°–600° F. (230–315° C.). At higher temperatures condensation takes place much faster but this at a sacrifice of color or formation of high acid value. The degree of polymerization is a direct coefficient of temperature and time, the only exception in this case being China-wood oil which suddenly becomes solid at a temperature above 500° F. The customary heating time is 5 to 7 hours. In the case of linseed oil, polymerization begins when the oil is heated to about 200° C.

We have now found that by effecting the heat polymerization of drying oils or of drying oil fatty acids under very high pressure, namely a pressure of above about 500 atmospheres, polymerized oils of improved properties are obtained from the drying oils, while polymerized drying oil fatty acids capable, when worked up by known methods, of yielding synthetic polymerized drying oils of improved properties, are obtained from the drying oil fatty acids. The improved properties referred to are improved with respect to the properties of the corresponding materials prepared by heat polymerization at low pressures.

According to the present invention, therefore, we produce polymerized drying oils or polymerized drying oil fatty acids by subjecting drying oils or drying oil fatty acids as the case may be, or materials containing the same, to the action of heat and of very high pressure, of at least about 500 atmospheres, for a sufficient period of time to effect substantial polymerization of the drying oils or drying oil fatty acids.

Suitable drying oils which may be treated by the invention are linseed oil, perilla oil, soya bean oil and the like, also certain fish oils, more especially those which have an iodine value above about 120, which, although not commonly classed as drying oils, are polymerizable and can be converted into polymerized oils adapted for use as paint or varnish ingredients.

The term "drying oil" used herein means any oil which can be polymerized by heat and pressure to yield a product like stand oil, suitable for use as an ingredient for paints, varnishes, printing inks and the like.

The drying oil fatty acids employed according to the invention may be synthetic or natural materials. They may suitably be obtained in known manner by saponification of the drying oils and acidification of the products. The initial material, i. e., drying oils or drying oil fatty acids, may be subjected to a preliminary de-gassing treatment prior to polymerization so as to remove any dissolved oxygen or any water that may be present, these impurities being liable to cause undesired decomposition during the polymerization.

The ploymerization may be carried out as a batch process or as a continuous process; in the latter case the oils or the fatty acids may be compressed to the required high pressure and passed through a heated tube, at the exit end of which is a valve regulating the through-put in accordance with the required reaction time, which may be chosen to give, say, a product of a certain viscosity.

The products from the polymerization may, with the object of effecting a still further improvement in their properties, be subjected to short-path high-vacuum distillation, mainly with the objects of distilling away unpolymerized material from the desired polymerized material and of removing any undesired decomposition products which may have formed during the polymerization stage.

By a short-path high-vacuum distillation is meant a distillation under a very high vacuum of the order of $10^{-2}$ to $10^{-6}$ mm. of mercury, and under conditions such that the distilling and condensing surfaces are in close proximity, usually about 1–5 cm. apart.

The following examples are given to illustrate how the invention may be carried out and the nature of the products obtained. The invention is not, however, limited to the materials and conditions described in the examples.

Example 1

An alkali-refined linseed oil, having an iodine value of 183.6 and an acid number of 0.09, was heated at 325° C. under a pressure of 3000 atmospheres, for 1½ hours. The product had a viscosity of 103 poises, an iodine value of 123, and an acid value of 9.4; its colour was rather lighter than that of the original oil.

For comparison, another sample of the original oil was heated under atmospheric pressure to 325° C. for 1½ hours; the product had a viscosity of 7 poises, an iodine value of 127.6, and an acid value of 13.5.

Varnishes were made from the above two products and from a commercial stand oil (having a viscosity of 95 poises) and the drying times compared. In carrying out the tests, the oils, with the addition of 0.1 per cent by weight of cobalt (added as the linoleate) were thinned with turpentine to a viscosity of about 3 poises, and the varnish was allowed to stand for 24 hours and then flowed on to glass panels.

| Varnish made from— | Drying time in hours | | |
|---|---|---|---|
| | Surface set | Hard set | Tack free |
| Linseed oil heated to 325° C. for 1½ hours at atmospheric pressure. | 5½ | Over 10 | Not after 24 hours. |
| Commercial stand oil | 5¾ | Over 10 | Not after 24 hours. |
| Linseed oil heated to 325° C. for 1½ hours under a pressure of 3000 atmospheres. | 3½ | 7 | Tack free after 24 hours. |

Example 2

Fatty acids obtained from linseed oil in known manner, by saponifying the crude linseed oil with caustic soda solution, followed by acidification with sulphuric acid, were heated at 280° C. under a pressure of 3000 atmospheres for 3 to 4 hours. The product was substantially colourless, or of comparatively light colour, and consisted of a mixture of polymerized and monomeric fatty acids. The latter were removed by distillation in vacuo (e. g. by short-path high-vacuum distillation) and the polymeric acids were esterified, yielding a polymerized drying oil which was also substantially colourless or comparatively light-coloured.

For comparison, polymerization of another sample of the fatty acids was effected under the usual conditions, without the application of pressure. A heating time of 12–15 hours was required to effect the same degree of polymerization at 280° C. and both the product of the polymerization and the polymerized drying oil prepared therefrom by esterification had an undesirable dark brown colour.

Example 3

This example shows the effect of different high pressures and times of treatment on the heat polymerization of linseed oil at 260° C., the criterion chosen being the viscosity of the stand oil. The results are shown in the following table:

| Pressure (atmospheres) | Time (minutes) | Viscosity (poises) |
|---|---|---|
| 12,000 | 30 | 31.6 |
| 12,000 | 45 | 72.7 |
| 6,300 | 30 | 1.7 |
| 6,300 | 60 | 5.8 |
| 6,300 | 90 | 27.2 |
| 3,400 | 75 | 1.6 |
| 3,400 | 120 | 2.4 |
| 1 | 360 | 1.4 |
| 1 | 960 | 8.5 |

Example 4

A sample of soya bean oil was polymerized by heating for 70 minutes at 325° C. under a pressure of 3000 atmospheres. The product was subjected to short-path high-vacuum distillation. Varnishes were made, in a manner similar to that described in connection with Example 1, from the residue from the distillation, also from the residue from the short-path high-vacuum distillation of a sample of soya bean oil which had been polymerized (to about the same viscosity) at atmospheric pressure. The drying times of the two varnishes were as follows:

| Varnish made from residue from short-path distillation of— | Drying time in hours | |
|---|---|---|
| | Surface set | Hard set |
| High pressure polymerized oil | 4¾ | 8¾ |
| Low pressure polymerized oil | 6½ | Over 26 |

In the examples the temperatures are all polymerizing temperatures as conventionally understood in the art.

Various modifications of the materials and procedure previously described may be made in carrying out our invention, and all such modifications are intended to come within the scope of the appended claims in so far as they achieve to a useful degree the new results, improvements and advantages hereinbefore described.

We claim:

1. The process of converting drying oil fatty acids into a polymerized drying oil, which comprises polymerizing such acids by subjecting them to the action of heat at a temperature of at least approximately 260° C., and of a pressure of at least about 500 atmospheres, for a time sufficient to effect substantial polymerization of the fatty acids, recovering the resulting polymerized drying oil fatty acids and esterifying them to produce a polymerized drying oil.

2. The process of converting drying oil fatty acids into a polymerized oil which comprises polymerizing such acids by subjecting them to the action of heat at a temperature of at least approximately 260° C., and of a pressure of at least about 500 atmospheres, for a time sufficient to effect substantial polymerization of the fatty acids, submitting the resulting product to short-path high-vacuum distillation to remove undesired materials such as unpolymerized acid and decomposition products therefrom, and esterifying the residue of said distillation to produce a polymerized drying oil.

3. The process of polymerizing linseed oil which comprises subjecting said oil to the action of a temperature of about 325° C. and of a pressure of about 3000 atmospheres for a period of about 1½ hours.

4. The process of polymerizing linseed oil fatty acids which comprises subjecting said acids to the action of a temperature of about 280° C. and of a pressure of about 3000 atmospheres for a period of about 3 to 4 hours.

5. The process of polymerizing soya bean oil which comprises subjecting said oil to the action of a temperature of about 325° C. and of a pressure of about 3000 atmospheres for a period of about 70 minutes.

6. A process of producing improved polymerized drying oils which comprises subjecting a substance selected from the class consisting of linseed oil, perilla oil, soya bean oil and fish oils having an iodine value above 120, and the corresponding drying oil fatty acids, to a pressure of 3000 to 12,000 atmospheres at a temperature of 260° to 325° C. for a period of time, not over four hours, sufficient to achieve the required degree of polymerization.

ERIC WILLIAM FAWCETT.
REGINALD OSWALD GIBSON.
MICHAEL WILLCOX PERRIN.